March 7, 1939. J. W. WHITE 2,149,651
BRAKE CONSTRUCTION
Filed Jan. 27, 1936 2 Sheets-Sheet 1

INVENTOR
JOHN WILLIAM WHITE
BY Whittemore Hulbert
Whittemore & Belknap
ATTORNEYS March 7, 1939. J. W. WHITE 2,149,651
BRAKE CONSTRUCTION
Filed Jan. 27, 1936  2 Sheets-Sheet 2

INVENTOR
JOHN WILLIAM WHITE
BY *Whittemore Hulbert*
*Whittemore & Belknap*
ATTORNEYS Patented Mar. 7, 1939

2,149,651

UNITED STATES PATENT OFFICE 2,149,651

BRAKE CONSTRUCTION

John William White, Detroit, Mich., assignor to Kelsey-Hayes Wheel Company, Detroit, Mich., a corporation of Delaware Application January 27, 1936, Serial No. 61,080

7 Claims. (Cl. 188—152)

The invention relates to wheel brakes and more particularly to a construction comprising floating brake friction means and a floating hydraulic actuator therefor. It is one of the objects of the invention to utilize the sum of the strokes of oppositely moving pistons for the application of the brake in both forward and reverse rotation of the drum. It is a further object to maintain the same conditions where adjustment is made to compensate for wear of the brake lining. With these and other objects in view the invention consists in the construction as hereinafter set forth.

Figure 1:
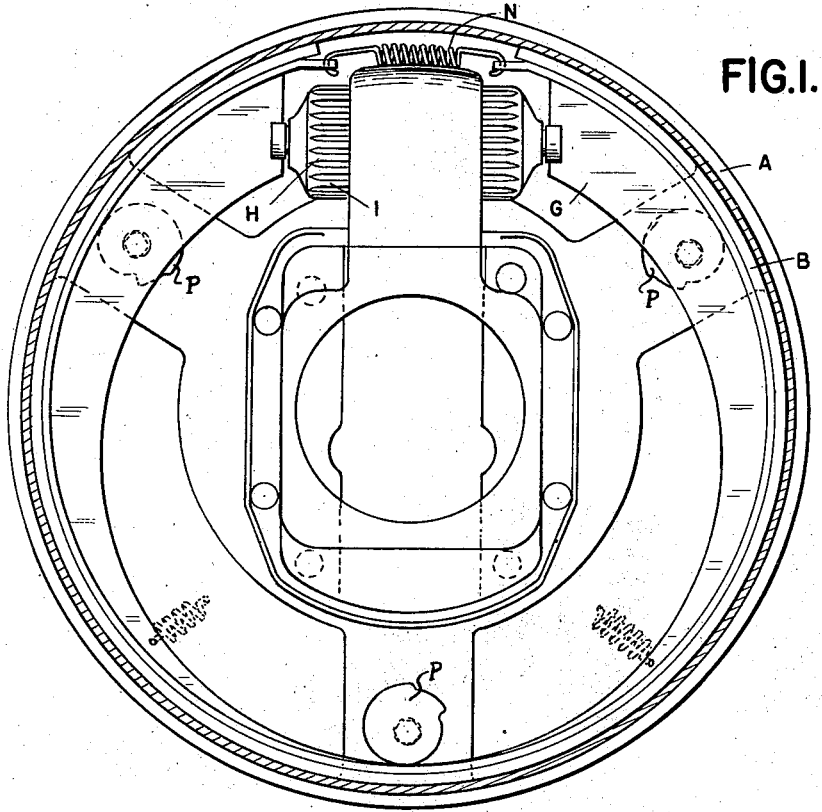
Figure 1 is an elevation of a brake drum and brake mechanism to which my improvements are applied.
Figure 3:
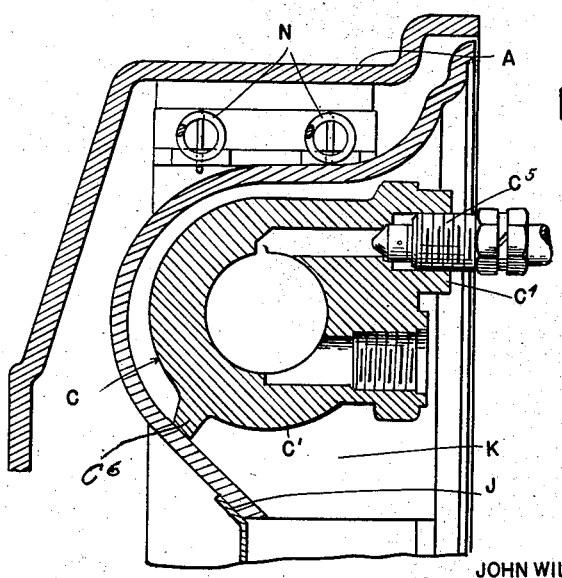
Figure 3 is a cross-section on line 3—3 of Figure 2.
Figure 4:
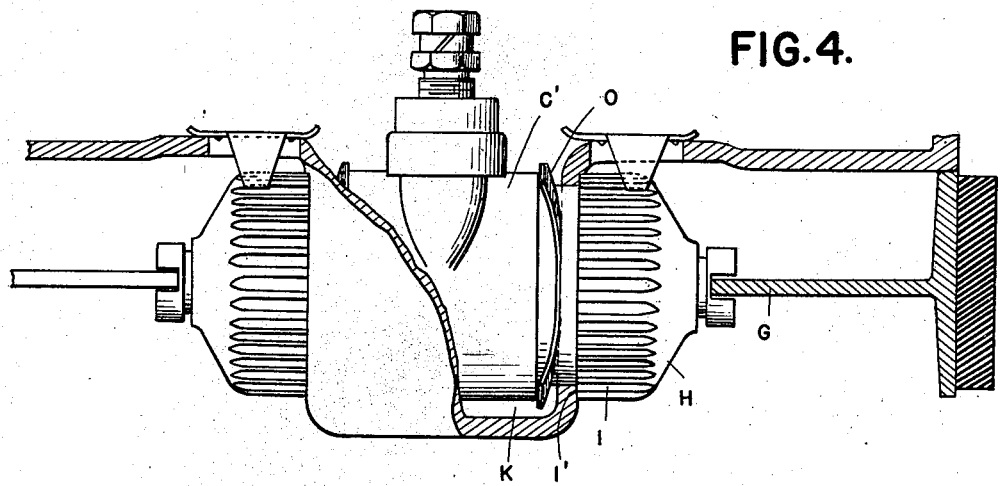
Figure 4 is a sectional elevation on line 4—4 of Figure 2.
Figure 2:
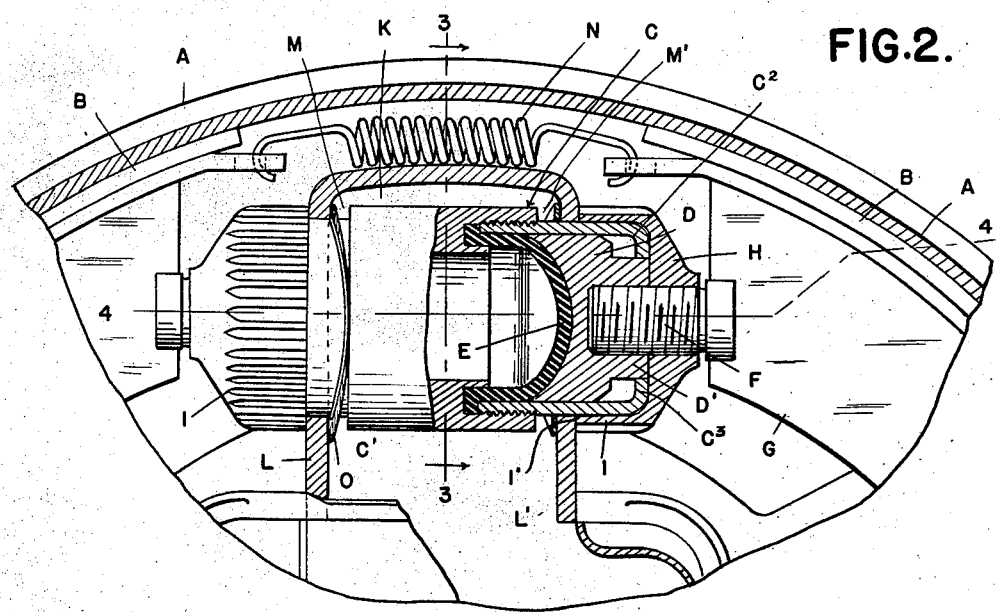
Figure 2 is an enlarged sectional elevation of the actuating cylinder.

As illustrated, A is the brake drum and B the braking means in the form of a continuous band extending upon both sides of the drum. C is an hydraulic actuator comprising a central annular portion C', cupped cylinder portions $C^2$ of smaller external diameter having a threaded engagement with said annular portion, pistons D slidably engaging the cylinder portions $C^2$, and dome-shaped flexible sealing cups E fitting in concave recesses in said pistons and peripherally clamped by the cylinder portions $C^2$. Each of the pistons D is limited in its outward movement by the flanges $C^3$ of the cylinder portions $C^2$ and has a portion D' of reduced diameter extending outward. This portion is recessed to slidably receive a threaded member F which at its outer end is bifurcated to embrace the web G of the brake shoe. A nut H threadedly engaging the member F serves to adjust the same with respect to the piston D and is provided with an annular flange I surrounding the cylinder portion $C^2$ forming an annular shoulder I' for a purpose hereinafter described.

Usually hydraulic cylinders of the type just described are fixedly anchored to the backing plate or brake head and consequently the maximum stroke of the pistons is the clearance between the large portions thereof and the flanges $C^2$. With my improved construction in place of a fixed cylinder I employ a floating construction, thereby doubling the effective stroke without increasing the displacement of the individual pistons and the flexible cups therefor, the construction being as follows.

The backing plate or brake head J is fashioned to form a recess K in its rear face at the point where the cylinder C is located and upon opposite sides of this recess are parallel wall portions L and L'. These wall portions have aligned apertures therein for receiving the cylinder portions $C^2$ and the length of the central annular portion C' with respect to the dimension between the walls L and L' is such as to leave clearance spaces M and M' therebetween. Thus, the cylinder C is free to move in either direction with respect to the backing plate, but its movement is limited by the engagement of the ends of the annular portion C' with one or the other of the walls L and L'. The brake band B is also floating, its opposite ends being resiliently drawn towards each other by an intermediate spring N and consequently whenever the actuator is operated to bring the brake band in frictional contact with the surface of the drum the first movement will be a rotation of the band and a sliding movement of the actuator until the shoulder I' of one of the portions I engages with one of the walls L and L' to prevent further movement. Thus, in the further application of hydraulic pressure one of the pistons will be held stationary by the pressure of the brake shoe against the member F which will cause the cylinder portions $C^2$ and annular portions C' to move until limited by the impingement of the portion I' against one of the walls L and L'.

To hold the parts normally centered spring washers O are preferably arranged between the shoulder ends of the portion C' and the walls L and L'. These, together with the spring N, will normally hold the brake band concentric with the drum and spaced to be out of contact therewith. As the portion C' lies within the recess K, it is exposed to the external atmosphere which facilitates dissipation of heat. A lug $C^6$ engaging an eccentric portion of the wall of the recess K holds the cylinder from turning. The hydraulic fluid is conveyed to the cylinder through the usual flexible tube which connects with a nipple $C^4$ and does not interfere with the sliding movement of the cylinder. There is also provided an air bleed connection with the upper portion of the cylinder which is normally closed by the plug $C^5$. The brake is further provided with the usual auxiliary devices necessary for its satisfactory operation such as eccentrics P for adjusting the release position of the brake band B which, however, form no part of the present invention and are therefore not further described.

What I claim as my invention is:

1. The combination with a brake drum and a backing plate therefor, of floating brake friction means operatively associated with the drum, an hydraulic actuator between opposite ends of said brake friction means comprising a cylinder and oppositely moving pistons therein for engaging the respective ends of said brake friction means, and a bearing on said backing plate in which said cylinder is slidably mounted for axial movement, said bearing also constituting an anchor stop alternatively for opposite ends of said brake friction means, and means between said brake friction means and each piston for engaging said stop.

2. The combination with a brake drum and a backing plate therefor, of floating brake friction means operatively associated with the drum, an hydraulic actuator between opposite ends of said brake friction means comprising a cylinder, oppositely moving pistons therein and adjustment means between said pistons and the respective ends of said brake friction means, and a bearing on said backing plate in which said cylinder is slidably mounted for axial movement, said bearing also constituting in cooperation with said adjustment means a stop alternatively for opposite ends of said brake friction means.

3. The combination with a brake drum and a backing plate therefor, of floating brake friction means operatively associated with the drum, an hydraulic actuator between opposite ends of said brake friction means comprising a cylinder, oppositely moving pistons therein, stops forming a fixed limit to the stroke of each piston, adjustment means between each piston and the adjacent end of the brake friction means including a member maintained in fixed relation to said cylinder and a bearing on said backing plate in which said cylinder is slidably mounted, said bearing also forming a stop for engaging the member of each adjustment means which is maintained in fixed relation to the cylinder and thereby forming an anchor alternatively for opposite ends of the brake friction means.

4. The combination with a brake drum and a backing plate therefor, of floating brake friction means operatively associated with the drum, an hydraulic actuator between opposite ends of said brake friction means comprising a cylinder, oppositely moving pistons therein, adjustment means between said pistons and the adjacent ends of the brake friction means, said adjustment means including a screw threaded stud rotatively fixed to the brake friction means and a nut engaging said stud and provided with an annular portion surrounding said cylinder, and a bearing on said backing plate in which said cylinder is slidably mounted with clearance between the annular portion of each of said nuts and said bearing whereby the initial engagement of said brake friction means with said drum will move the annular portion of one or the other of said nuts against said bearing to constitute an anchor.

5. The combination with a brake drum and a backing plate therefor, of floating brake friction means operatively associated with the drum, an hydraulic actuator comprising a cylinder, pistons in the opposite ends of said cylinder for respectively actuating opposite ends of said brake friction means, a bearing on said backing plate surrounding said cylinder and in which the latter is slidably mounted for axial movement, and means independent of said cylinder for transmitting the thrusts of opposite ends of said brake band alternatively to said bearing whereby both the cylinder and one of the pistons are moved to actuate the opposite end of said brake friction means.

6. The combination with a brake drum and a backing plate therefor, of floating brake friction means operatively associated with the drum, an hydraulic actuator comprising a cylinder having a central portion and end portions of smaller diameter leaving shoulders therebetween, pistons in the opposite ends of said cylinders for respectively actuating opposite ends of said brake friction means, a hollow bearing on said backing plate surrounding the smaller diametered portions of said cylinder and enclosing the large diametered portion thereof with a clearance between said shoulders and bearing, resilient means between said shoulders and bearing for holding said cylinder normally centralized with respect to said bearing, and means interposed between said bearing and the opposite ends respectively of said brake friction means for transmitting the thrust from the latter to said bearing independent of said cylinder whereby said cylinder together with one of said pistons is moved to actuate the opposite end of said brake friction means.

7. The combination with a brake drum and a backing plate therefor, of floating brake friction means operatively associated with said drum, an hydraulic actuator between opposite ends of said brake friction means comprising a cylinder having a central portion, end portions of externally smaller diameter and oppositely moving pistons in said cylinder, a hollow casing rigid with said backing plate having parallel side walls apertured to slidably receive the small diametered portions of said cylinder, the central large diametered portion being enclosed within said walls with end clearance therebetween, resilient means between said central portion of the cylinder and side walls of the casing to normally centralize the cylinder with respect thereto, connecting members between said pistons and the opposite ends of said brake friction means, and members secured to said connecting means surrounding the small diametered portions of said cylinder and normally bearing against the side walls of said casing to alternatively form anchors for said brake friction means.

JOHN WILLIAM WHITE.